(12) United States Patent
Fountain et al.

(10) Patent No.: US 12,360,596 B2
(45) Date of Patent: Jul. 15, 2025

(54) WEARABLE DEVICES HAVING MULTIPLE DISTRIBUTED RADIO FREQUENCY IDENTIFICATION ANTENNAS

(71) Applicant: ZEBRA TECHNOLOGIES CORPORATION, Lincolnshire, IL (US)

(72) Inventors: Mark Thomas Fountain, Hitchin (GB); Nils Allan Stefan Stalgren, Cary, NC (US); Ronald Zancola, Phoenix, AZ (US); Benjamin Jean Limongi, Marseilles (FR)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/026,085

(22) PCT Filed: Sep. 14, 2021

(86) PCT No.: PCT/US2021/050152
§ 371 (c)(1),
(2) Date: Mar. 13, 2023

(87) PCT Pub. No.: WO2022/056430
PCT Pub. Date: Mar. 17, 2022

(65) Prior Publication Data
US 2023/0334274 A1  Oct. 19, 2023

Related U.S. Application Data

(60) Provisional application No. 63/078,081, filed on Sep. 14, 2020.

(30) Foreign Application Priority Data

Sep. 30, 2020 (EP) .................................... 20306127

(51) Int. Cl.
*G06F 3/01* (2006.01)
*G06F 1/16* (2006.01)
(Continued)

(52) U.S. Cl.
CPC .............. *G06F 3/014* (2013.01); *G06F 1/163* (2013.01); *G06F 1/1656* (2013.01);
(Continued)

(58) Field of Classification Search
CPC ..... G06F 3/014; G06F 9/451; G06K 7/10396; H01Q 1/273
(Continued)

(56) References Cited

U.S. PATENT DOCUMENTS 10,534,939 B1   1/2020 Bellows
11,857,304 B1 * 1/2024 Baldwin .............. A61B 5/0507
(Continued)

FOREIGN PATENT DOCUMENTS

JP   2009/104376 A   5/2009
JP   2012/524948 A   10/2010
(Continued)

OTHER PUBLICATIONS

Search Report for European U.S. Appl. No. 20/306,127 mailed on Mar. 13, 2021.
(Continued)

*Primary Examiner* — Ahshik Kim

(57) ABSTRACT

Example wearable devices having multiple distributed radio frequency identification (RFID) antennas are disclosed. A disclosed example wearable device includes a first RFID antenna; a second RFID antenna; a processor configured to activate one of the first RFID antenna or the second RFID antenna based upon at least one of a location or a type of an RFID object external to the wearable device; and a body, wherein an RFID radio, the first RFID antenna, and the
(Continued)

second RFID antenna are disposed at respective positions along the body. The wearable device may include the RFID radio, wherein, when the wearable device is worn, the RFID radio and the processor are disposed at one or more fingers of a user's hand, the first RFID antenna is disposed at an upper side of the user's hand, and the second RFID antenna is disposed at a user's wrist.

20 Claims, 6 Drawing Sheets

(51) Int. Cl.
    *G06F 3/041*     (2006.01)
    *G06F 3/044*     (2006.01)
    *G06F 3/0488*     (2022.01)
    *G06F 3/14*     (2006.01)
    *G06F 9/451*     (2018.01)
    *G06K 7/10*     (2006.01)
    *G06K 7/14*     (2006.01)
    *H01Q 1/27*     (2006.01)

(52) U.S. Cl.
    CPC .......... *G06F 1/1677* (2013.01); *G06F 3/0416* (2013.01); *G06F 3/044* (2013.01); *G06F 3/0488* (2013.01); *G06F 3/14* (2013.01); *G06F 9/451* (2018.02); *G06K 7/10316* (2013.01); *G06K 7/10396* (2013.01); *G06K 7/1413* (2013.01); *H01Q 1/273* (2013.01)

(58) Field of Classification Search
    USPC ........................................................ 235/451
    See application file for complete search history.

(56) References Cited

U.S. PATENT DOCUMENTS

| | | |
|---|---|---|
| 2010/0097195 A1 | 4/2010 | Majoros et al. |
| 2014/0249944 A1* | 9/2014 | Hicks ................... G07G 1/0081 |
| | | 235/383 |
| 2016/0267310 A1 | 9/2016 | AlNasser et al. |
| 2016/0371520 A1 | 12/2016 | Hosseini et al. |
| 2018/0196978 A1 | 7/2018 | DeBates et al. |
| 2019/0010495 A1 | 1/2019 | Boitano et al. |
| 2020/0096599 A1 | 3/2020 | Hewett et al. |
| 2020/0150714 A1* | 5/2020 | Sakamoto ............... G06F 3/014 |
| 2020/0272801 A1* | 8/2020 | Mistkawi ............. G06K 7/1408 |

FOREIGN PATENT DOCUMENTS

| | | |
|---|---|---|
| WO | 20190148239 A1 | 8/2019 |
| WO | 2020132077 A1 | 6/2020 |

OTHER PUBLICATIONS

International Search Report and Written Opinion for International Application No. PCT/US2021/050152 mailed on Dec. 8, 2021.

* cited by examiner

WEARABLE DEVICES HAVING MULTIPLE DISTRIBUTED RADIO FREQUENCY IDENTIFICATION ANTENNAS

FIELD OF THE DISCLOSURE

This application relates generally to wearable devices and, more particularly, to wearable devices having radio frequency identification (RFID) antennas.

BACKGROUND

Traditional wearable devices have their components (e.g., electronics module, RFID radio, RFID antenna, batteries) implemented together (e.g., stacked), which can become too bulky, thick, tall, wide, heavy to be practically worn on the fingers or back of the hand. For example, the wearable device may interfere with a shelf structure when the user handles objects thereon.

Accordingly, there is a need for improved wearable devices.

SUMMARY

In some use cases, wearable devices having an RFID radio/radio with read/write capabilities, and two or more directional RFID antennas oriented in different directions are desired. One directional RFID antenna is inward facing, such as toward the user or below the wrist (e.g., disposed on the inside of the user's wrist or below the wrist and having a directional radiation pattern oriented for reading RFID tags on packages located on the inside of the user's hand and/or wrist), and another directional RFID antenna is outward facing from the user (e.g., in various embodiments, disposed on top of the user's hand or on the outside of the user's wrist and having a directional radiation pattern oriented for RFID communication sessions directed away from a user, such as toward a car/van/truck location adjacent to the user). In the illustrated embodiments, the components of wearable devices are distributed across a user's fingers, the back of their hand, the upper side of the user's wrist and the lower side the user's wrist to lower the profile of the wearable device. This also increases flexibility and distributes weight for comfort. In some embodiments, Bluetooth interconnections reduce interference with wrist and knuckle movements. There are many configurations possible. In one embodiment, one or both of the directional RFID antennas are activated based upon the object type and/or location of the object with which the wearable device is or will interface (e.g., activated automatically or manually via a user interface on the wearable device's display, including based upon detection or selection of location of objects requiring an RFID communication session). In an embodiment, the directional RFID antennas are integrated into a wrist and finger mounted support on which an RFID radio is disposed.

In an embodiment, a wearable device includes a first RFID antenna; a second RFID antenna; a processor; and a body. The processor configured to activate one of the first RFID antenna or the second RFID antenna based upon at least one of a location or a type of an RFID object external to the wearable device. The RFID radio, the first RFID antenna, and the second RFID antenna disposed at respective positions along the body.

In an embodiment, a wearable device includes a first RFID antenna, a second RFID antenna, a processor, and a body. The processor configured to determine a type of object to be identified by the wearable device and activate one of the first RFID antenna or the second RFID antenna based upon the type of object. The first RFID antenna, and the second RFID antenna disposed at respective positions along the body.

In an embodiment, a wearable device includes a battery module, an RFID module including an RFID radio, a first RFID antenna, a second RFID antenna, an electronics module including a processor, and a body. The processor configured to activate one of the first RFID antenna or the second RFID antenna based upon at least one of a location or a type of an RFID object external to the wearable device. When the wearable device is worn, the battery module, the RFID module and the electronics module are stacked and disposed at one or more fingers of a user's hand, the first RFID antenna is disposed at an upper side of the user's hand, and the second RFID antenna is disposed at a user's wrist.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
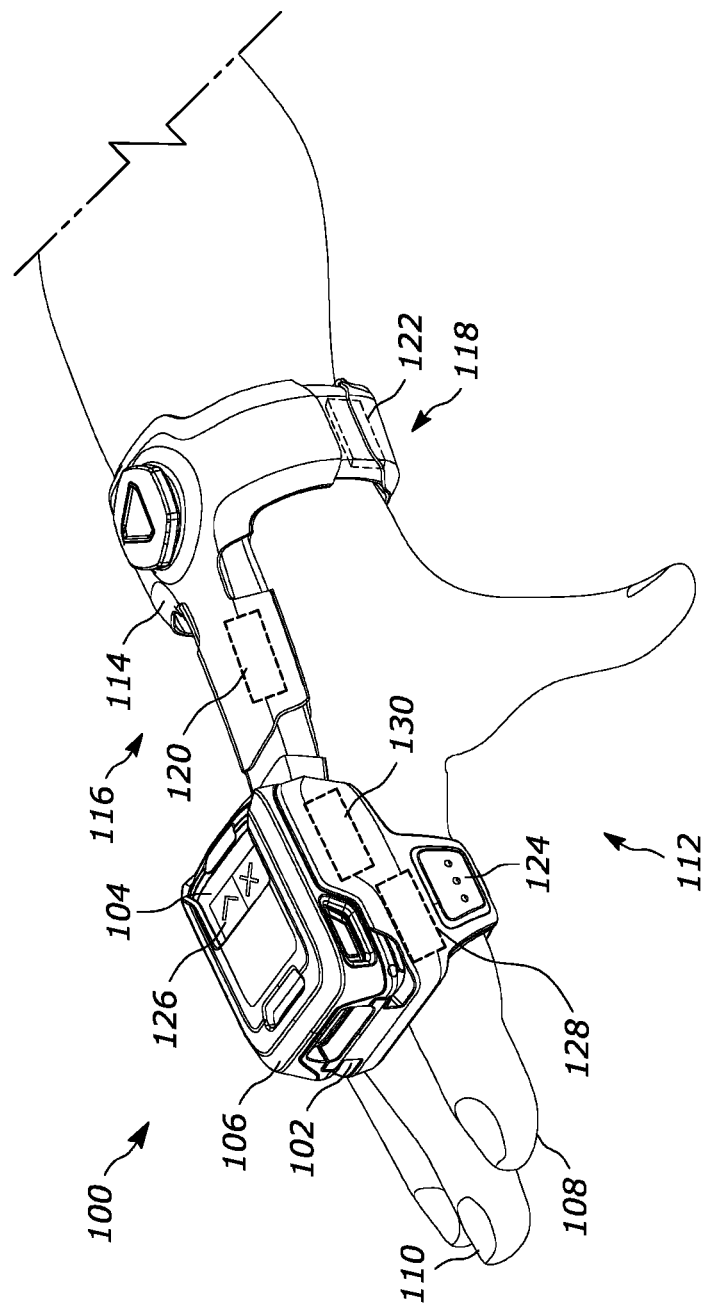
FIGS. 1 and 2 illustrate an example finger and wrist mounted wearable device, in accordance with aspects of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

Figure 2:
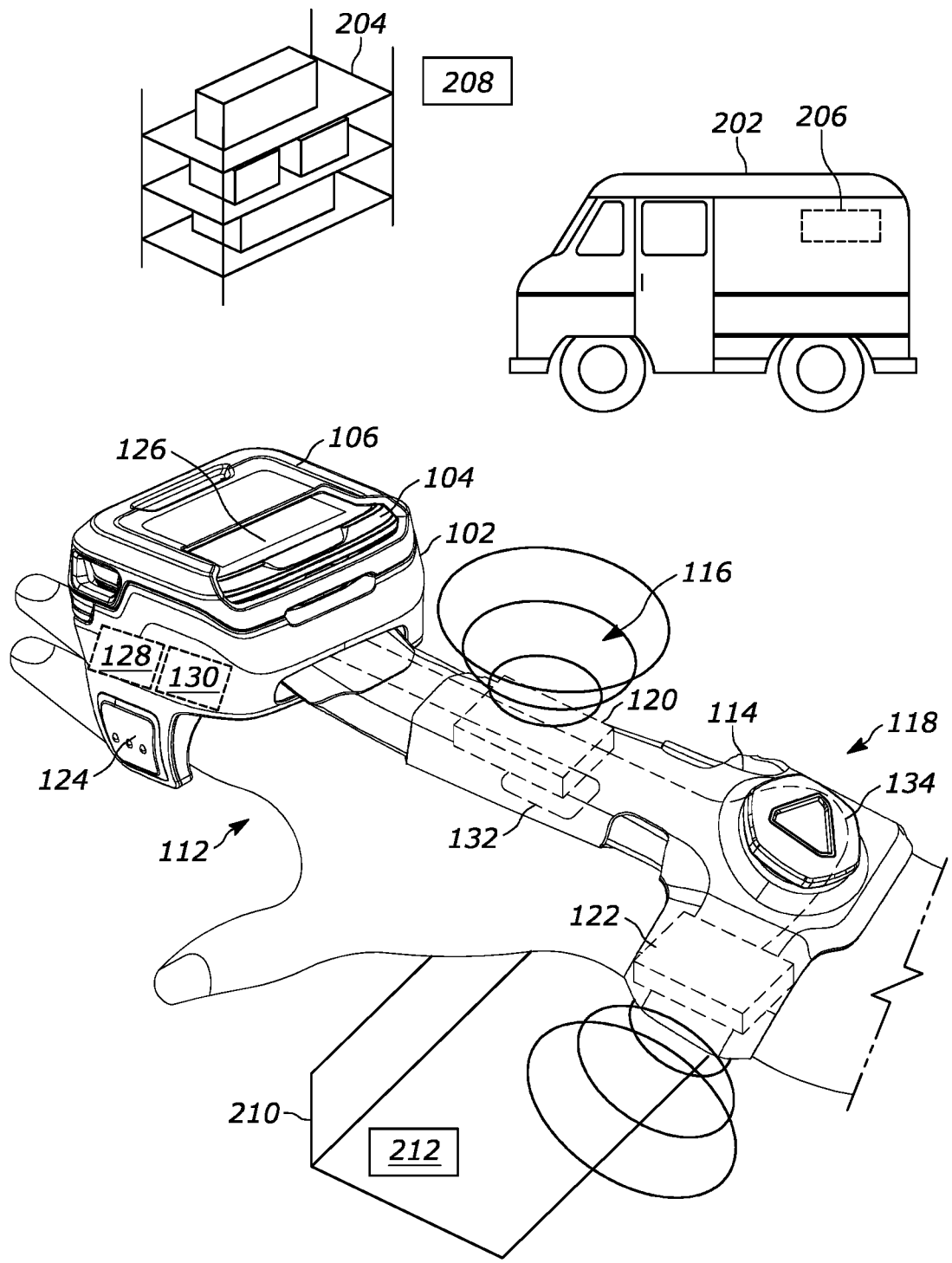

FIGS. 1 and 2 illustrate an example finger and wrist mounted wearable device 100 in accordance with aspects of this disclosure. The wearable device 100 may be configured to capture images of printed identification data such as a barcode, indicia or the like, and/or to electromagnetically read electromagnetically stored identification data such as a Radio Frequency Identification (RFID) tag, near field communication (NFC) tag, or the like. The wearable device 100 includes an example housing 102 in which a core electronics module 104 is selectively received, and a protective cover 106 that is coupled (e.g., rotatably or slidably) to the housing 102 to selectively secure the core electronics module 104 within the housing 102. As shown in FIG. 1, the housing 102 is formed to configure the wearable device 100 as a wearable device that is worn on one or more fingers (e.g., pointer finger 108 and middle finger 110) of a wearer's hand 112.

As shown best in FIG. 2, the housing 102 is selectively coupled, mechanically and electrically, to a flexible structure 114 that extends down across the upper side 116 of a user's hand 112 and wraps around and is secured at the user's wrist 118. Together, the housing 102 and the flexible structure 114 form a body along which components are disposed at respective positions. A first outward facing directional RFID antenna 120 is adapted to be disposed in the flexible structure 114 at the upper side 116 of the user's hand 112, and a second inward facing directional RFID antenna 122 is adapted to be disposed in the flexible structure 114 at or near the lower side of the user's wrist 118 (e.g., in the vicinity of the user's wrist pulse point). Alternatively or in addition, in another embodiment, an outward facing directional RFID antenna may be disposed in the flexible structure 114 on the outside of the user's wrist (e.g., disposed on the opposite side of the wrist from the location of the RFID antenna 122). In some examples, the wearable device 100 is operable without the flexible structure 114 and RFID antennas 120, 122 when, for example, RFID functionality is not needed.

The first outward RFID antenna 120 is configured (e.g., directionally oriented) for RFID communication sessions directed toward RFID objects located above a user's hand. For example, toward a location identification RFID tag 202, 204 on a car, van 206, truck, location, shelf 208, etc.

The second inward RFID antenna 122 is configured (e.g., directionally oriented) for RFID communication sessions directed toward RFID objects located below a user's hand. For example, for reading an object identifier RFID tag 210 on a package 212 inside, beneath, etc. the user's hand 112 that they have or are going to touch, grasp, gesture toward or pick up.

The core electronics module 104 determines which or both of the RFID antennas 120 and 122 are active at a particular time based upon, for example, the expected location of the next RFID object that the wearable device is expected to interface with. For example, activated automatically or manually (e.g., via a trigger button 124 on the housing 102 or a user interface on a display 126), including based upon detection or selection of location of objects requiring an RFID communication session. In some examples, a user who is loading the truck 202 may configure their wearable device to alternately activate the RFID antennas 120, 122 so they may read the RFID tag 212 on the package 210 with the inward facing RFID antenna 122, and then use the outward facing RFID antenna 120 to communicate with the RFID device 206 in the truck 202 to indicate the package has been loaded on the truck 202. In some examples, reading of an RFID object is confirmed before the RFID antenna is switched. For instances, the RFID object is successfully read a threshold number of times (e.g., 20) with at least a threshold received signal strength indicator (RSSI). In some examples, detection of movement is used to determine when to switch RFID antenna. For example, movement may be indicative that a user is carrying a package in the direction of a truck and trigger activation of the outward facing RFID antenna 120. Movement may be detected based upon, for example, an accelerometer reading, a change in a wireless signal (e.g., WiFi, Bluetooth, etc.), a change in a cellular signal, a change in a positioning signal (e.g., GPS), including based on triangulation of the above signals. Different types of RFID objects have different electronic product code (EPC) header values (e.g., starting with 123 for a package, or starting with 456 for a truck) and/or support signals of different ranges of frequencies. In some examples, the RFID antennas 120, 122 are each adapted, tuned, or configured to communicate with all types of RFID objects of interest, in which case, the RFID antenna 120, 122 that is activated is based upon expected RFID object location. In some examples, the RFID antennas 120, 122 are configured to communicate with a respective subset of RFID object types (e.g., only with RFID tags having particular EPC headers that encode certain object types, such as a package or a delivery truck object type), in which case, the RFID antenna 120, 122 that is activated is based upon expected RFID object type and/or object location.

In the illustrated example of FIGS. 1 and 2, an RFID radio/module 128 and a battery 130 are adapted to be disposed in the housing 102. The RFID radio 128 is coupled to the RFID antennas 120 and 122 via respective ultra-high frequency (UHF) cables 132, 134. In some examples, the UHF cables 132, 134 and/or the RFID antennas 120, 122 are replaceable. In some examples, the core electronics module 104, the RFID radio 128 as an RFID module, and the battery module 130 are modular components that can be stacked or combined in connection with the housing 102. In some examples, a barcode reader (not shown) is adapted to be disposed in the housing 102 in conjunction with the core electronics module 104. In some examples, the RFID radio 128 is multi-channel and can interact with RFID objects simultaneously with both RFID antennas 120, 122.

FIGS. 1 and 2 illustrate one example distribution of components by the wearable device 100. FIGS. 3-7 schematically illustrate additional example distribution of components by a wearable device, for example disposed along the flexible structure 114 of FIGS. 1 and 2 (not shown in FIGS. 3-7 for simplicity).

Figure 3:
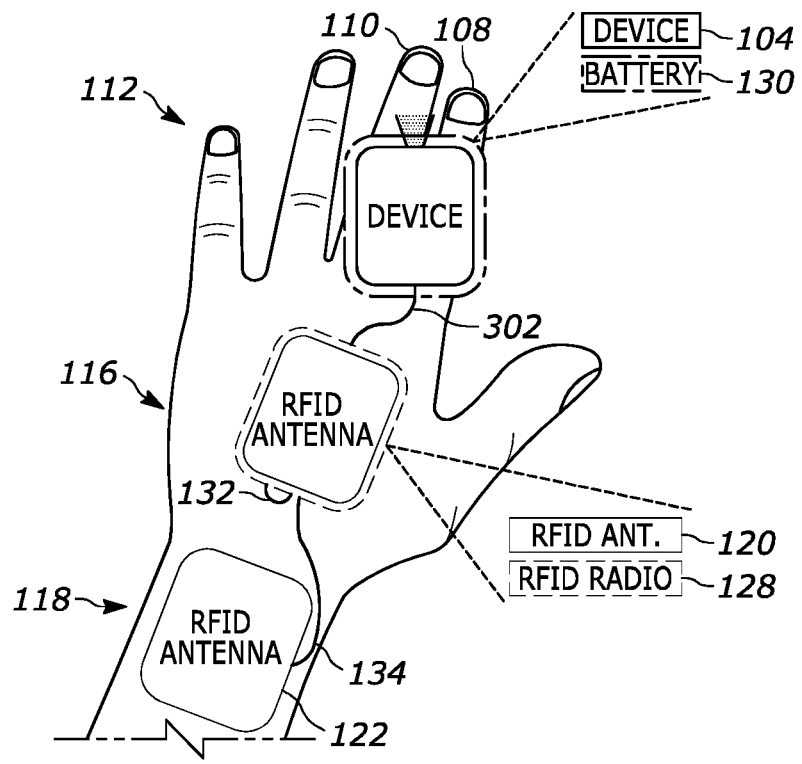
FIG. 3 illustrates another example finger and wrist mounted wearable device, in accordance with aspects of this disclosure.

Compared to the example of FIGS. 1 and 2, in the illustrated example of FIG. 3, the RFID radio 128 is adapted to be disposed on the upper side 116 of the user's hand 112 with the outward facing RFID antenna 120 and is communicatively coupled to the core electronics module 104 via a wired connection 302 such as a universal serial bus (USB) cable. The battery 130 can provide power for the RFID radio 128 over the USB cable 302.

Figure 4:
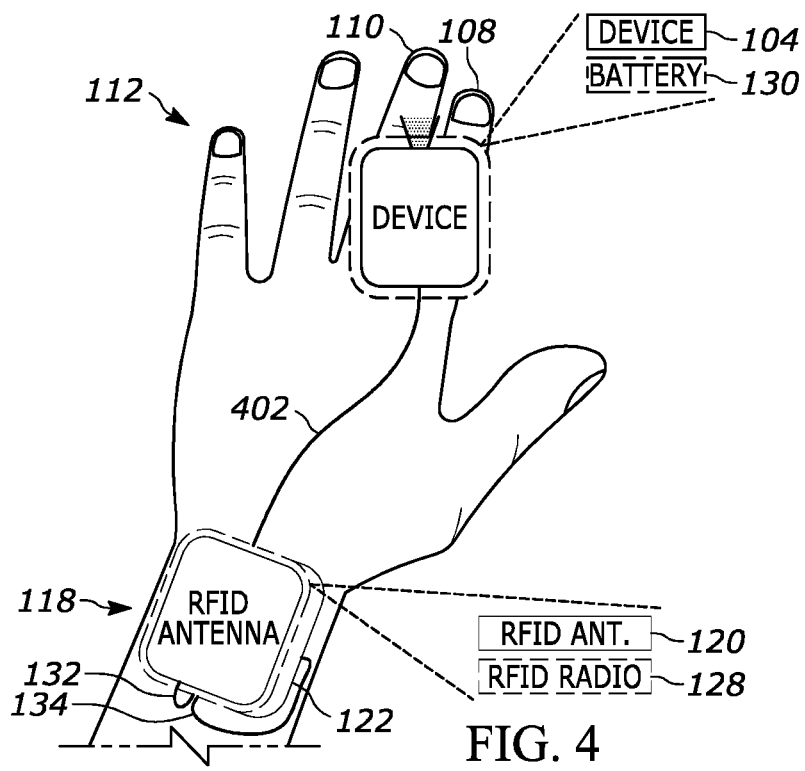
FIG. 4 illustrates yet another example finger and wrist mounted wearable device, in accordance with aspects of this disclosure.

Compared to the example of FIGS. 1 and 2, in the illustrated example of FIG. 4, the RFID radio 128 is adapted to be disposed at the upper side of the user's wrist 118 with the outward facing RFID antenna 120 and is communicatively coupled to the core electronics module 104 via wired connection 402 such as a USB cable. The battery 130 can provide power for the RFID radio 128 over wired connection.

Figure 5:
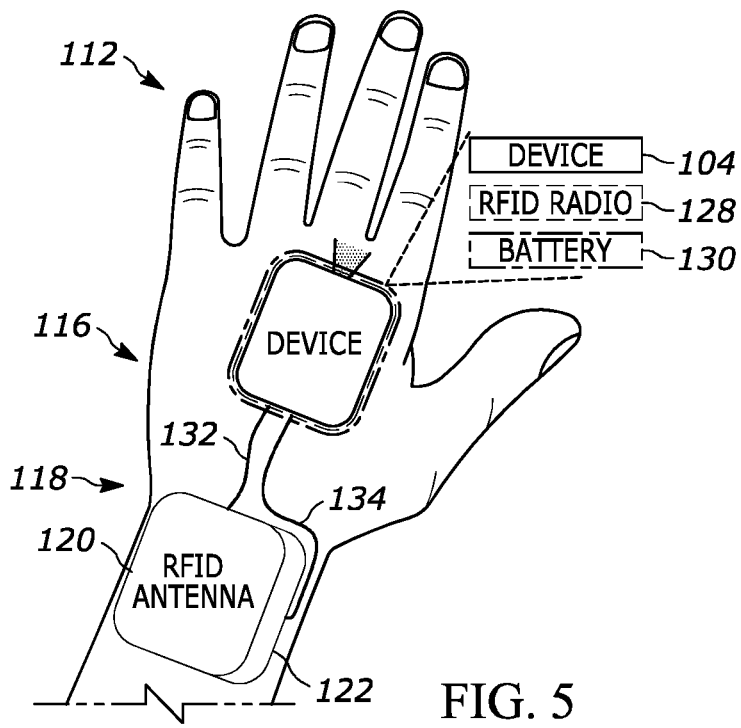
FIG. 5 illustrates an example hand and wrist mounted wearable device, in accordance with aspects of this disclosure.

Compared to the example of FIGS. 1 and 2, in the illustrated example of FIG. 5, the core electronics module 104, the RFID radio 128 and the battery 130 are adapted to be disposed at the upper side 116 of the user's hand 112, and the outward facing RFID antenna 120 is adapted to be disposed at the upper side of the user's wrist 118.

Figure 6:
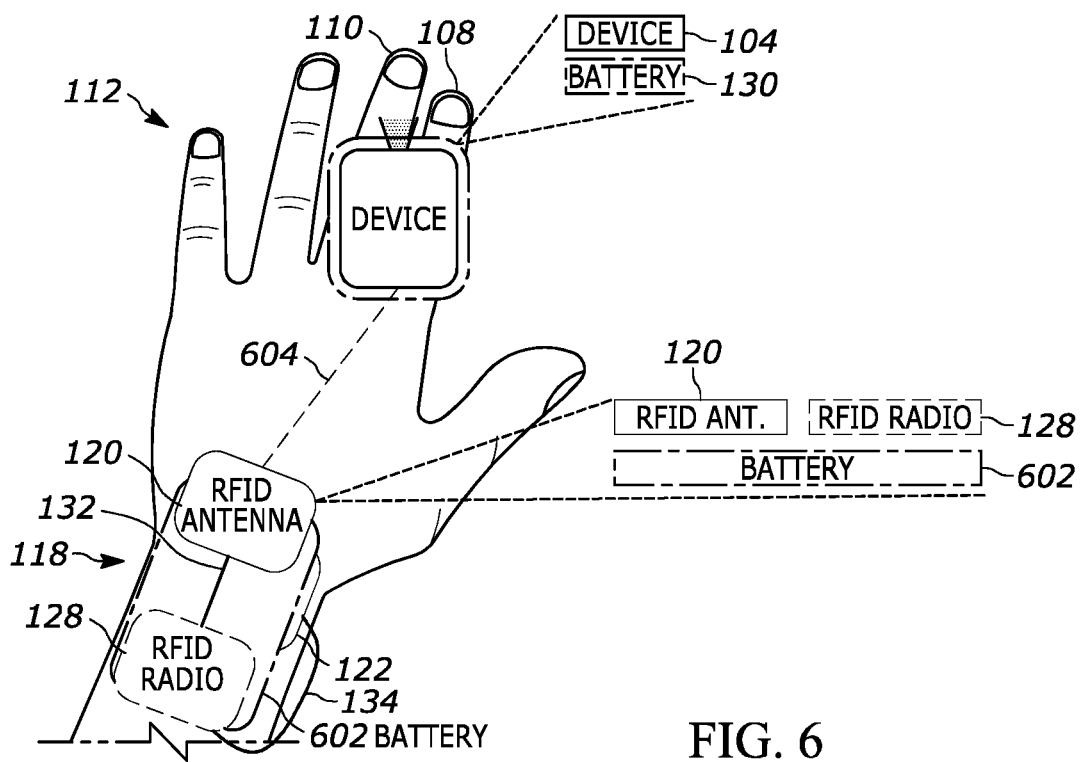
FIG. 6 illustrates a further example finger and wrist mounted wearable device, in accordance with aspects of this disclosure.

Compared to the example of FIGS. 1 and 2, in the illustrated example of FIG. 6, the core electronics module 104 and the battery 130 are adapted to be disposed at the upper side 116 of the user's hand 112, the RFID radio 128 is adapted to be disposed with the outward facing RFID antenna 120 and an additional battery 602 at the upper side of the user's wrist 118, and the RFID radio 128 is communicatively coupled to the core electronics module 104 via a wireless transmission protocol connection 604 such as a Bluetooth connection.

Figure 7:
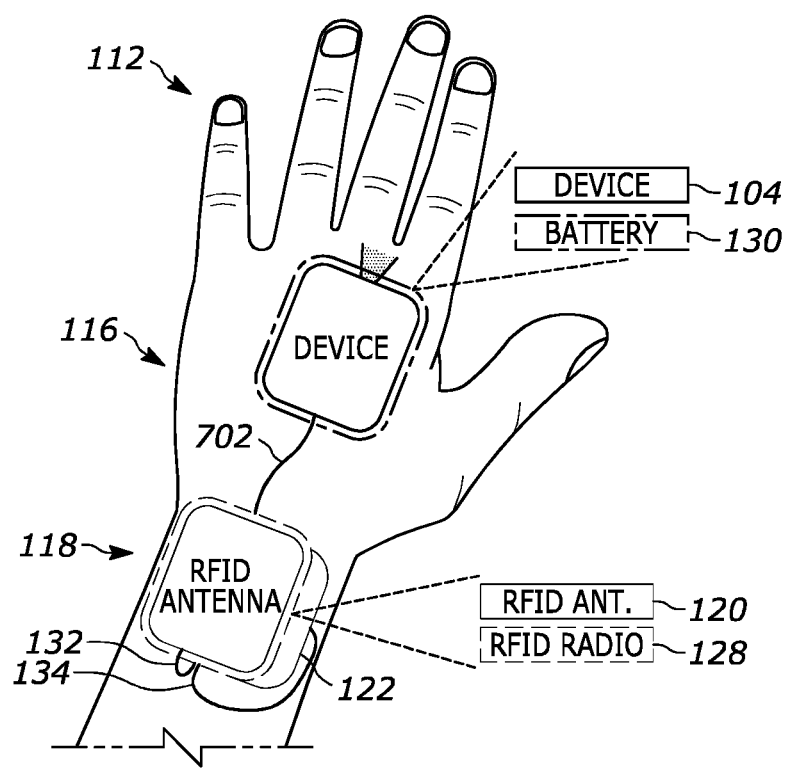
FIG. 7 illustrates another example hand and wrist mounted wearable device, in accordance with aspects of this disclosure.

Compared to the example of FIGS. 1 and 2, in the illustrated example of FIG. 7, the RFID radio 128 is adapted to be disposed at the upper side 116 of the user's hand 112 with the outward facing RFID antenna 120 and is communicatively coupled to the core electronics module 104 via a wired connection 702 such as a USB cable. The battery 130 can provide power for the RFID radio 128 over the wired connection.

While example wearable device configurations having distributed RFID antenna are shown in FIGS. 1-7, persons of ordinary skill in the art will readily appreciate that wearable devices may have RFID antennas distributed in other configurations.

Figure 8:
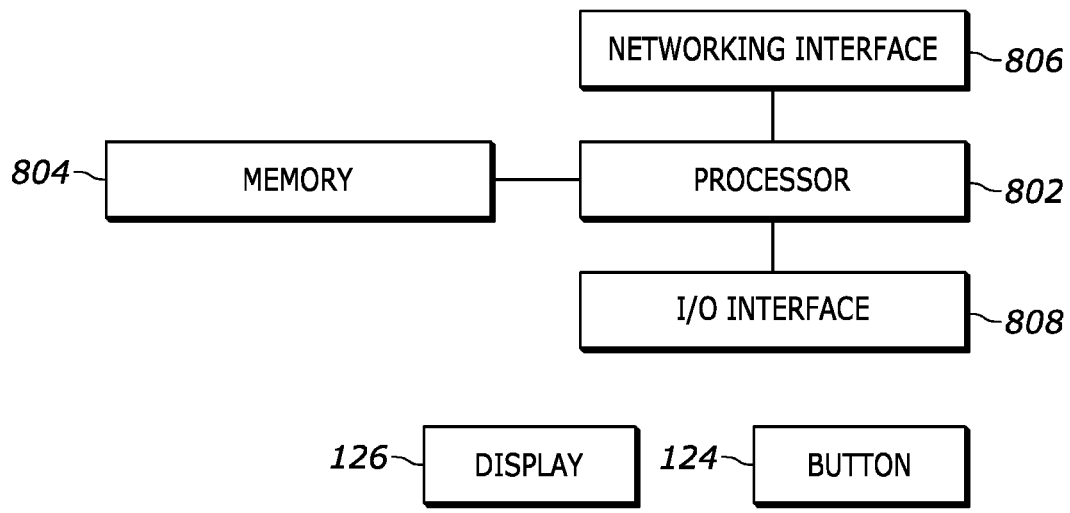
FIG. 8 is a block diagram of an example logic circuit for implementing example methods and/or operations described herein.

FIG. 8 is a block diagram representative of a logic circuit in the form of an example processing platform 800 that may be used to implement the core electronics module 104. The processing platform 800 is capable of executing instructions to, for example, implement operations of the example methods described herein. Other example logic circuits capable of, for example, implementing operations of the example methods described herein include field programmable gate arrays (FPGAs) and application specific integrated circuits (ASICs).

The example processing platform 800 of FIG. 8 includes a processor 802 such as, for example, one or more microprocessors, controllers, and/or any suitable type of processor. The example processing platform 800 of FIG. 8 includes any number or types of non-transitory memory 804 (e.g., volatile memory, non-volatile memory, etc.) and/or storage devices accessible by the processor 802 (e.g., via a memory controller) in which information may be stored for any duration (e.g., permanently, for an extended time period, for a brief instance, for temporarily buffering, for caching of the information, etc.). The example processor 802 interacts with the memory 804 to obtain, for example, computer- or machine-readable instructions stored in the memory 804 corresponding to, for example, the operations disclosed herein. Additionally or alternatively, computer- or machine-readable instructions corresponding to the example operations described herein may be stored on one or more removable media (e.g., an optical storage drive, a compact disc, a digital versatile disk, a removable flash memory, etc.) that may be coupled to the processing platform 800 to provide access to the computer- or machine-readable instructions stored thereon.

The example processing platform 800 of FIG. 8 also includes a network interface 806 to enable communication with other machines via, for example, one or more networks. The example network interface 806 includes any suitable type of communication interface(s) (e.g., wired and/or wireless interfaces) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, or any other suitable communication protocols or standards.

The example processing platform 800 of FIG. 8 also includes input/output (I/O) interfaces, circuits, components 808 to enable receipt of user input and communication of output data to the user. The I/O interfaces, circuits, components 808 may, additionally and/or alternatively, enable the processor 802 to communicate with peripheral I/O devices. Example I/O interfaces, circuits, components 808 include the display 126, the trigger button 124, a universal serial bus (USB) interface, a Bluetooth® interface, an NFC interface, the RFID radio 128, an RFID antenna, a barcode reader, an accelerometer, a global positioning system (GPS) receiver, an imaging assembly, and/or an infrared transceiver. The peripheral I/O devices may be any desired type of I/O device such as a keyboard, a navigation device (e.g., a mouse, a trackball, a capacitive touch pad, a joystick, etc.), a speaker, a microphone, a printer, a button, etc.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored computer- or machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes computer- or machine-readable instructions to perform operations (e.g., one or more of the operations described herein and/or represented by the flowcharts of this disclosure, if such are present). Some example logic circuits include a combination of specifically configured hardware and hardware that executes computer- or machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by computer- or machine-readable instructions (e.g., software and/or firmware) stored on a medium (e.g., a tangible computer- or machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and computer- or machine-readable instructions stored on a medium (e.g., a tangible computer- or machine-readable medium) for execution by logic circuit(s).

Figure 9:
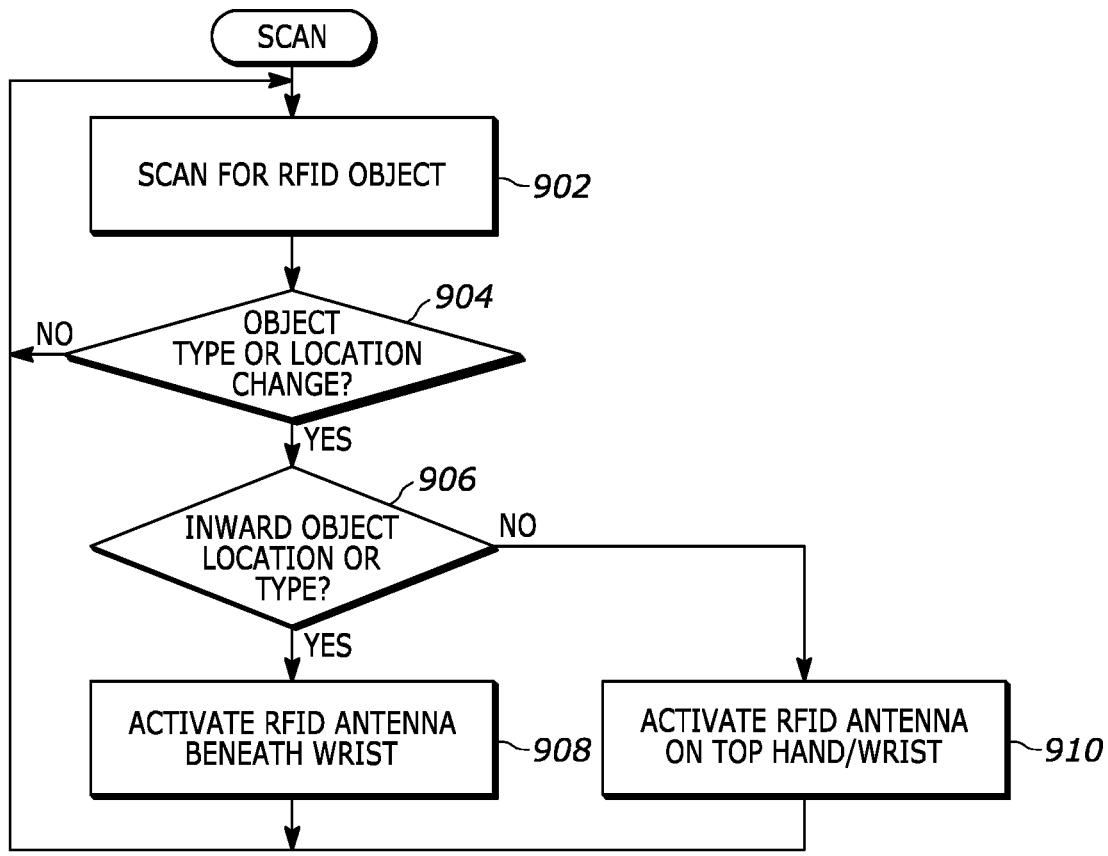
FIG. 9 is a flowchart representative of an example method, hardware logic or machine-readable instructions for implementing the example methods and/or operations described herein.

A flowchart 900 representative of example processes, methods, software, computer- or machine-readable instructions for implementing the core electronics module 104 is shown in FIG. 9. The processes, methods, software and instructions may be an executable program or portion of an executable program for execution by a processor such as the processor 802 of FIG. 8. The program may be embodied in software or instructions stored on a non-transitory computer- or machine-readable storage medium such as a compact disc (CD), a hard drive, a digital versatile disk (DVD), a Blu-ray disk, a cache, flash memory, read-only memory (ROM), random access memory (RAM), a ROM (Read Only Memory), a PROM (Programmable Read Only Memory), an EPROM (Erasable Programmable Read Only Memory), an EEPROM (Electrically Erasable Programmable Read Only Memory), or any other storage device or storage disk associated with the processor 802 in which information is stored for any duration (e.g., for extended time periods, permanently, for brief instances, for temporarily buffering, and/or for caching of the information). Further, although the example program is described with reference to the flowchart illustrated in FIG. 9, many other methods of implementing the example core electronics module 104 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operation without executing software or instructions.

The example program of FIG. 9 begins with the RFID radio 128 scanning for RFID objects using whichever RFID antenna 120, 122 is currently active (block 902). The core electronics module 104 looks for changes in the expected location and/or RFID object type for the next RFID object to detect (block 904). As discussed above, a change in the expected object location may be based on user input via a user interface of the device, while a change to the RFID object type may be based on decoding an RFID tag having an EPC header that encodes a corresponding object type, such as a package or a vehicle object type, among others. In steps 906-908, when either the object's expected location or object type correspond to an object located inward from the user's wrist, including below the wrist, the device activates a directional RFID antenna disposed beneath the wrist (or inside of the user's wrist) to enhance the signal quality. On the other hand, in step 910, when either the object's expected location or object type correspond to an object located outward from the user's wrist, such as an adjacent vehicle being loaded, the device activates the directional RFID antenna disposed on top of the hand or on top or on the outer side of the wrist to enhance the quality of the RFID read session for such objects.

Example wearable devices having multiple distributed RFID antennas are disclosed herein. Further examples and combinations thereof include at least the following.

Example 1 is a wearable device that includes a first RFID antenna; a second RFID antenna; a processor configured to activate one of the first RFID antenna or the second RFID antenna based upon at least one of a location or a type of an RFID object external to the wearable device; and a body, wherein the RFID radio, the first RFID antenna, and the second RFID antenna are disposed at respective positions along the body.

Example 2 is the wearable device of example 1, wherein the processor is further configured to determine the location of the RFID object.

Example 3 is the wearable device of example 2, wherein the processor is further configured to: determine a type of the RFID object; and activate one of the first RFID antenna and the second RFID antenna based upon the type of the RFID object and the location of the RFID object.

Example 4 is the wearable device of example 1, wherein the RFID object is a first RFID object, and wherein the processor is further configured to, when reading of a second RFID object by the first RFID antenna is confirmed, activate the second RFID antenna to read the first RFID object.

Example 5 is the wearable device of example 1, wherein the processor is further configured to, when a movement of the wearable device is detected, switch from the first RFID antenna to the second RFID antenna to read the RFID object.

Example 6 is the wearable device of example 5, wherein the processor is further configured to detect the movement based upon at least one of an accelerometer, a change in a wireless signal, a change in a cellular signal, or a change in a positioning signal.

Example 7 is the wearable device of any of examples 1 to 6, wherein, when the wearable device is worn, the first RFID antenna is disposed on an upper side of a user's hand.

Example 8 is the wearable device of any of examples 1 to 6, wherein, when the wearable device is worn, the second RFID antenna is disposed at or near a user's wrist.

Example 9 is the wearable device of any of examples 1 to 6, further comprising an RFID radio, wherein, when the wearable device is worn, the RFID radio and the processor are disposed at one or more fingers of a user's hand, the first RFID antenna is disposed at an upper side of the user's hand, and the second RFID antenna is disposed at a user's wrist.

Example 10 is the wearable device of example 9, further comprising a barcode reader in communication with the processor in a core electronics module, wherein, when the wearable device is worn, the core electronics module is disposed at the one or more fingers, the RFID radio is disposed in an RFID module configured to be stacked with the core electronics module.

Example 11 is the wearable device of example 10, further comprising a battery module configured to be stacked with the core electronic module and the RFID module.

Example 12 is the wearable device of any of examples 1 to 6, further comprising an RFID radio, wherein, when the wearable device is worn, the processor is disposed at one or more fingers of a user's hand, the RFID radio and the first RFID antenna are disposed at an upper side of the user's hand, and the second RFID antenna is disposed at or near a user's wrist.

Example 13 is the wearable device of any of examples 1 to 6, further comprising an RFID radio, wherein, when the wearable device is worn, the processor is disposed at one or more fingers of a user's hand, the RFID radio and the first RFID antenna are disposed at an upper side of a user's wrist, and the second RFID antenna is disposed at a lower side of the user's wrist.

Example 14 is the wearable device of any of examples 1 to 6, further comprising an RFID radio, wherein, when the wearable device is worn, the processor and the RFID radio are disposed at an upper side of a user's hand, the first RFID antenna is disposed at an upper side of a user's wrist, and the second RFID antenna is disposed at a lower side of the user's wrist.

Example 15 is the wearable device of any of examples 1 to 6, further comprising an RFID radio, wherein, when the wearable device is worn, the processor is disposed at an upper side of a user's hand, the RFID radio and the first RFID antenna are disposed at an upper side of a user's wrist, and the second RFID antenna is disposed at a lower side of the user's wrist.

Example 16 is the wearable device of any of examples 1 to 15, further comprising a core electronics module that includes the processor, the processor configured to control the RFID radio to activate RFID antennas.

Example 17 is the wearable device of any of examples 1 to 15, further comprising an RFID radio, wherein the processor is coupled to the RFID radio via a wired connection.

Example 18 is the wearable device of example 14, further comprising a battery configured to provide power to the RFID radio via the wired connection.

Example 19 is the wearable device of any of examples 1 to 15, further comprising an RFID radio, wherein the processor is coupled to the RFID radio via a wireless transmission protocol.

Example 20 is the wearable device of any of examples 1 to 15, further comprising an RFID radio, wherein the processor is further configured to control the RFID radio to activate RFID antennas.

Example 21 is a wearable device that includes a first RFID antenna, a second RFID antenna, a processor, and a body. The processor configured to determine a type of object to be identified by the wearable device and activate one of the first RFID antenna or the second RFID antenna based upon the type of object. The first RFID antenna, and the second RFID antenna disposed at respective positions along the body.

Example 22 is the wearable device of example 21, wherein the processor is further configured to activate one of the first RFID antenna or the second RFID antenna based upon a location of an object external to the wearable device.

Example 23 is a wearable device that includes a battery module, an RFID module including an RFID radio, a first RFID antenna, a second RFID antenna, an electronics module including a processor, and a body. The processor configured to activate one of the first RFID antenna or the second RFID antenna based upon a location of an RFID object external to the wearable device. When the wearable device is worn, the battery module, the RFID module and the electronics module are stacked and disposed at one or more fingers of a user's hand, the first RFID antenna is disposed at an upper side of the user's hand, and the second RFID antenna is disposed at a user's wrist.

From the foregoing, it will be appreciated that example improved wearable devices having multiple distributed RFID antennas have been disclosed. By distributing components, including the multiple RFID antennas, as disclosed herein the improved wearable devices can have a lower profile, increased flexibility, better weight distribution, improved comfort, and reduced interference with wrist and knuckle movements.

As used herein, each of the terms "tangible machine-readable medium," "non-transitory machine-readable medium," "machine-readable storage device," "tangible computer-readable medium," "non-transitory computer-readable medium" and "computer-readable storage device" is expressly defined as a storage medium (e.g., a platter of a hard disk drive, a digital versatile disc, a compact disc, flash memory, read-only memory, random-access memory, etc.) on which computer- or machine-readable instructions (e.g., program code in the form of, for example, software and/or firmware) are stored for any suitable duration of time (e.g., permanently, for an extended period of time (e.g., while a program associated with the computer- or machine-readable instructions is executing), and/or a short period of time (e.g., while the computer- or machine-readable instructions are cached and/or during a buffering process)). Further, as used herein, each of the terms "tangible machine-readable medium," "non-transitory machine-readable medium," "machine-readable storage device," "tangible computer-readable medium," "non-transitory computer-readable medium" and "computer-readable storage device" is expressly defined to exclude propagating signals. That is, as used in any claim of this patent, none of the terms "tangible machine-readable medium," "non-transitory machine-readable medium," "machine-readable storage device," "tangible computer-readable medium," "non-transitory computer-readable medium" and "computer-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A wearable device, the wearable device comprising:
   a first radio frequency (RF) antenna;
   a second RF antenna;
   a processor configured to select for activation one of the first RF antenna or the second RF antenna based upon at least one of a location or a type of an RF object external to the wearable device; and
   a body, wherein a radio, the first RF antenna, and the second RF antenna are disposed at respective positions along the body,
   wherein the processor is further configured to, when a movement of the wearable device is detected, switch from the first RF antenna to the second RF antenna to read the RF object.

2. The wearable device of claim 1, wherein the processor is further configured to determine at least one of the location of the RF object or the type of the RF object.

3. The wearable device of claim 1, wherein the RF object is a first RFID object, and wherein the processor is further configured to, when reading a second RFID object by the first RF antenna is confirmed, activate the second RF antenna to read the first RFID object.

4. The wearable device of claim 1, wherein the processor is further configured to detect the movement based upon at least one of an accelerometer, a change in a wireless signal, or a change in a positioning signal.

5. The wearable device of claim 1, wherein, when the wearable device is worn, the first RF antenna is disposed on an upper side of a user's hand.

6. The wearable device of claim 1, wherein, when the wearable device is worn, the second RF antenna is disposed at or near a user's wrist.

7. The wearable device of claim 1, wherein, when the wearable device is worn, the radio and the processor are disposed at one or more fingers of a user's hand, the first RF antenna is disposed at an upper side of the user's hand, and the second RF antenna is disposed at or near a user's wrist.

8. The wearable device of claim 7, further comprising a barcode reader in communication with the processor in a core electronics module, wherein, when the wearable device is worn, the core electronics module is disposed at the one or more fingers, the radio is disposed in an RF module configured to be stacked with the core electronics module.

9. The wearable device of claim 8, further comprising a battery module configured to be stacked with the core electronic module and the RF module.

10. The wearable device of claim 1, wherein the processor is further configured to control the radio to activate one of the first RF antenna or the second RF antenna.

11. The wearable device of claim 1, wherein, when the wearable device is worn, the processor is disposed at one or more fingers of a user's hand, the radio and the first RF antenna are disposed at an upper side of the user's hand, and the second RF antenna is disposed at or near a user's wrist.

12. The wearable device of claim 1, wherein the processor is coupled to the radio via a wired connection.

13. The wearable device of claim 12, further comprising a battery configured to provide power to the radio via the wired connection.

14. The wearable device of claim 1, wherein the processor is coupled to the radio via a wireless transmission protocol.

15. The wearable device of claim 1, wherein, when the wearable device is worn, the processor is disposed at one or more fingers of a user's hand, the radio and the first RF antenna are disposed at an upper side of a user's wrist, and the second RF antenna is disposed at a lower side of the user's wrist.

16. The wearable device of claim 1, wherein, when the wearable device is worn, the processor and the radio are disposed at an upper side of a user's hand, the first RF antenna is disposed at an upper side of a user's wrist, and the second RF antenna is disposed at a lower side of the user's wrist.

17. The wearable device of claim 1, wherein, when the wearable device is worn, the processor is disposed at an upper side of a user's hand, the radio and the first RF antenna are disposed at an upper side of a user's wrist, and the second RF antenna is disposed at a lower side of the user's wrist.

18. The wearable device of claim 1, further comprising a core electronics module that includes the processor, the processor configured to control the radio to activate one of the first RF antenna or the second RF antenna.

19. A wearable device comprising:
a battery module;
an RFID radio;
a first RFID antenna;
a second RFID antenna;
an electronics module including a processor, wherein the processor is configured to select for activation one of the first RFID antenna or the second RFID antenna based upon at least one of a location or a type of an RFID object external to the wearable device; and
a body, wherein, when the wearable device is worn, the battery module, the RFID radio and the electronics module are stacked and disposed at one or more fingers of a user's hand, the first RFID antenna is disposed at an upper side of the user's hand, and the second RFID antenna is disposed at a user's wrist,
wherein the processor is further configured to, when a movement of the wearable device is detected, switch from the first RFID antenna to the second RFID antenna to read the RFID object.

20. A wearable device, the wearable device comprising:
a first radio frequency (RF) antenna;
a second RF antenna;
a processor configured to select for activation one of the first RF antenna or the second RF antenna based upon at least one of a location or a type of an RF object external to the wearable device; and
a body, wherein a radio, the first RF antenna, and the second RF antenna are disposed at respective positions along the body,
wherein the processor is coupled to the radio via a wireless transmission protocol.

* * * * *